US006505806B1

(12) United States Patent
Glaesener

(10) Patent No.: US 6,505,806 B1
(45) Date of Patent: Jan. 14, 2003

(54) DYNAMIC MACHINE MOUNT

(75) Inventor: Pierre Glaesener, Bissen (LU)

(73) Assignee: Husky Injection Molding Systems, Ltd. (CA)

( * ) Notice: Subject to any disclaimer, the term of this patent is extended or adjusted under 35 U.S.C. 154(b) by 0 days.

(21) Appl. No.: 09/567,833

(22) Filed: May 9, 2000

(51) Int. Cl.⁷ .............................................. E04B 1/98
(52) U.S. Cl. ...................... 248/638; 52/167.5; 248/677
(58) Field of Search ................................ 248/638, 649, 248/668, 669, 673, 677, 678, 679, 550; 52/167.4, 167.5, 167.6

(56) References Cited

U.S. PATENT DOCUMENTS

| | | | | |
|---|---|---|---|---|
| 99,973 A | * | 2/1870 | Touaillon ................. 52/167.5 |
| 1,761,659 A | * | 6/1930 | Cummings ............... 52/167.5 |
| 1,761,660 A | * | 6/1930 | Cummings ............... 52/167.5 |
| 2,014,643 A | * | 9/1935 | Bakker ..................... 384/49 |
| 2,359,036 A | * | 9/1944 | Harper ................... 296/35.1 |
| 3,306,562 A | * | 2/1967 | Bellefleur ............... 248/188.2 |
| 4,047,427 A | | 9/1977 | Young ..................... 73/141 A |
| 4,281,739 A | * | 8/1981 | Keiser ...................... 181/207 |
| 4,462,955 A | * | 7/1984 | Albin et al. .............. 376/272 |
| 4,705,257 A | * | 11/1987 | Leo et al. ................. 248/611 |
| 4,883,250 A | * | 11/1989 | Yano et al. ............... 248/638 |
| 4,917,211 A | * | 4/1990 | Yamada et al. ........... 181/0.5 |
| 4,974,378 A | * | 12/1990 | Shustov ................... 52/167 R |
| 5,022,628 A | | 6/1991 | Johnson et al. ........... 248/638 |
| 5,261,200 A | * | 11/1993 | Sasaki et al. ............ 52/167 R |
| 5,573,220 A | | 11/1996 | Whittaker et al. ........ 248/638 |
| 5,584,464 A | * | 12/1996 | Whittaker ................. 248/678 |
| 5,689,919 A | * | 11/1997 | Yano ....................... 52/167.6 |
| 5,690,304 A | | 11/1997 | Folkens ................... 248/188.4 |
| 5,804,776 A | * | 9/1998 | Bizlewicz ................. 181/207 |
| 5,827,095 A | | 10/1998 | Mantere ..................... 440/6 |
| 5,887,843 A | | 3/1999 | Hidekawa et al. ......... 248/559 |
| 6,000,670 A | | 12/1999 | Okamoto .................. 248/562 |
| 6,082,698 A | | 7/2000 | Dubois ..................... 248/568 |
| 6,123,313 A | * | 9/2000 | Otsuka et al. ............ 248/580 |

FOREIGN PATENT DOCUMENTS

| | | |
|---|---|---|
| DE | 24 1463 | 10/1975 |
| DE | 198 30 178 A1 | 1/2000 |
| FR | 2494397 | 11/1980 |
| JP | 10-46867 | 2/1998 |
| JP | 11-072140 | 3/1999 |
| JP | 20-00120776 | 4/2000 |
| SU | 607890 A * | 5/1978 ............ 52/167.6 |
| WO | WO 95/23267 | 8/1995 |
| WO | WO 99/07966 | 2/1999 |

OTHER PUBLICATIONS

Internet article located at http://www.kitagawaeurope.com/pages/kelmount.htm.
Web site home page located at http://www.unisorb.com.

* cited by examiner

Primary Examiner—Ramon O. Ramirez
Assistant Examiner—Jon Szumny
(74) Attorney, Agent, or Firm—Katten Muchin Zavis Rosenman

(57) ABSTRACT

A first machine mount is provided having an first load bearing member and a second load bearing member. A force dissipater is provided that dissipates a horizontal axial force by a vertical force. A second machine mount is provided having a first load bearing member, an intermediate load bearing member, and a second load bearing member. A first force dissipater and second force dissipater is provided that dissipates a horizontal planer force by a vertical force.

13 Claims, 7 Drawing Sheets

DYNAMIC MACHINE MOUNT

FIELD OF THE INVENTION

The present invention broadly relates to industrial machine mounts, for example mounts between a concrete foundation and a frame of a machine. More particularly, the invention relates to a mount for controlled redirection and dissipation of large horizontal forces effectively preventing the machine from creeping or walking.

BACKGROUND OF THE INVENTION

The field of industrial machine mounts is very well known and commonly used in industry. Heavy machinery such as presses, machine tools, turbines, generators, injection molding systems, Thixomolding system, and the like are typically mounted upon vertically adjustable mounts spaced apart from each other. The mounts typically include an adjustable member for leveling the machine, a load bearing member for supporting the machine, and a vibration dampening member. The vibration dampening members include pads formed of fabric, rubber, neoprene, or plastic materials capable of bearing the applied load of the machine.

However, in the past, machine mounts are prone to the problem of machine creeping and walking. Machine creeping and walking is caused by horizontal forces generated by the machine. Machine creeping and walking is movement of the machine, typically in one direction, under normal operation of the machine. Machine creeping and walking may also cause misalignment between different components of a system, for example an injection molding machine and a part conveyer.

Kitawaga Europe corporation offers the KEL range of conventional machine mounts as described on their internet web page (www.kitagawaeurope.com/machine-mount.htm) for use on general machines, impact machinery, presses, and injection molding machines. The mount includes a thick cylindrical elastomer base partially covered by a cylindrical metal support plate. The elastomer base is securely retained on a lower surface by a lip formed in the support plate. A threaded bolt for attaching and leveling extends upwardly from an upper surface of the support plate. The mount also includes an additional shock plate for increased vertical and horizontal load capacity required to accommodate the heavy impacts delivered by industrial machines such as presses and molding machines. The mount provides a rigid metal structure and interface between the machine and elastomer. In operation, the mount depends upon friction between the lower surface of the elastomer and a concrete foundation to resist motion.

UNISORB (registered trademark) Installation Technologies offers a range of vibration isolation pad materials and machine mounts as described on their internet web pages (www.unisorb.com). The pad materials generally reduce vibration. Some pad materials are designed with a high coefficient of friction to prevent machinery from creeping and walking. These mounts have generally rectangular rigid metal housing with a threaded attachment and adjustment rod extending upwardly from the housing and a pad is retained within the housing. The rectangular shape of the pad provides greater resistance to machine walking than a circular shape of a pad. Alternatively, the threaded attachment and adjustment rod may be replaced with a wedge type mount that includes a sliding wedge to provide mechanical lift for alignment and leveling. U.S. Pat. No. 5,573,220 issued to Unisorb Incorporated on May 20, 1995. A heavy duty vibration absorbing and leveling machinery mount is disclosed. The mount includes an adjustable metal structure including four pockets at each corner. Each of the four pockets contain a stack of vibration absorbing elements in the form of pads. The lowermost pads rest upon the floor.

Other prior art solutions require the machine to be bolted to an anchor in the floor which is inconvenient and does not absorb all the shock force.

The aforedescribed prior art devices are prone to machine walking when horizontal machine forces exceed the frictional force between the pad and the floor.

Therefore, it is desirable to provide a machine mount which overcomes the aforedescribed problems of machine creeping and walking. There is a need to dissipate horizontal forces generated by the operation of machinery for preventing machine creeping and walking.

Accordingly, it is a principal object of the present invention to provide a machine mount that prevents machine creeping and walking.

It is another object of the present invention to provide a machine mount capable of supporting a very heavy load.

It is another object of the present invention to provide a machine mount that uses the weight of the machine to counteract a directional horizontal force.

It is another object of the present invention to provide a machine mount that used the weight of the machine to counteract omni directional horizontal forces.

SUMMARY OF THE INVENTION

There is a need for solving the problems of the prior art devices and preventing a machine from walking or creeping due to high horizontal shock forces.

The present invention finds advantage in preventing a machine from walking due to high horizontal shock force.

The present invention also finds advantage in automatically resetting to an initial rest position to accept the next high horizontal shock force.

The present invention also finds advantage in applying a static vertical force (weight) to counteract and dissipate a high horizontal shock force.

The present invention also finds advantage is providing a cost effective machine mount.

The present invention also finds advantage in replacing the conventional thick non-slip neoprene pad with a thin non-slip coating which improves the vertical rigidity of the machine mount leading to more accurate leveling.

In accordance with a primary broad aspect of the present invention there is provided a machine mount. The machine mount includes a first load bearing member for supporting said machine and a second load bearing member for supporting said machine. A force dissipater is disposed intermediate the first load bearing member and the second load bearing member. The force dissipater communicates with the first load bearing member and the second load bearing member permitting movement of the first load bearing member with respect to the second load bearing member between a rest position and elevated position dissipating force directed in a horizontal axis.

In accordance with secondary broad aspect of the present invention there is provided a machine mount. The machine mount includes a first load bearing member for supporting the machine, an intermediate load bearing member for supporting said machine, and a second load bearing member for supporting said machine. A first force dissipater is disposed intermediate the first load bearing member and the intermediate load bearing member. The first force dissipater communicates with the first load bearing member and the second load bearing member permitting movement between a rest position and an elevated. A second force dissipater is disposed intermediate the intermediate load bearing member and the second load bearing member. The second force dissipater communicates with the intermediate load bearing member and the second load bearing member permitting movement between a rest position and an elevated position, dissipating force directed in a horizontal plane.

BRIEF DESCRIPTION OF THE DRAWINGS

For a better understanding of the nature and objects of the present invention reference may be had to the accompanying diagrammatic drawings in which.

NUMERALS USED IN FIGURES

10 Primary Machine
12 Primary Machine Frame Member
14 Machine Mount Assembly
16 Concrete Foundation
18 Secondary Machine
20 Secondary Machine Frame Member
22 Machine Mount.
24 Height Adjustable Member
26 Floor Pad Member
28 First Load Bearing Member
30 Second Load Bearing Member
32 First Retainer
34 Second Retainer
36 Force Dissipating Cell
37 Upper Surface
38 Force Dissipater
40 Side Surface
42 Side Surface.
44 Side Surface
46 Side Surface
48 Bottom Surface
50 Upper Bearing Surface
52 Side Surface
54 Side Surface
56 Side Surface.
58 End Surface.
59 First Inwardly Extending Contour Surface.
60 First Roller
61 First Complimentary Inwardly Extending Contour Surface
62 Second Roller
63 Second Inwardly Extending Contour Surface.
64 Third Roller
66 Bearing Surface
67 Third Complimentary Inwardly Extending Contour Surface.
68 First Inclined Surface
69 Third Inwardly Extending Contour Surface.
70 Apex
72 Second Inclined Surface
74 Second Bearing Surface
76 First Bearing Surface
78 First Complimentary Inclined Surface
80 Apex
82 Second Complimentary Inclined Surface
84 Second Bearing Surface
86 First Section
88 Second Section
90 Outer Surface
92 Third Section
94 Fourth Section
96 First Bearing Surface.
98 Inwardly Extending Contour Surface.
100 Second Bearing Surface
102 First Bearing Surface
104 Complimentary Concave Inwardly Extending Contour Surface
106 Second Bearing Surface
108 First Bearing Surface
110 First Inclined Surface
112 Apex
114 Second Inclined Surface
116 Second Bearing Surface
118 First Bearing Surface
120 Complimentary Inclined Surface
122 Apex
124 Inclined Surface
126 Second Bearing Surface
128 Machine Mount
130 Retainer
132 Retainer
134 Intermediate Load Bearing Member
136 Second Load Bearing Member
138 First Load Bearing Member
140 Fourth Roller
142 Fifth Roller
144 Sixth Roller
146 Second Force Dissipater
148 Second Force Dissipating Cell

DETAILED DESCRIPTION OF THE PREFERRED EMBODIMENT

Figure 1:
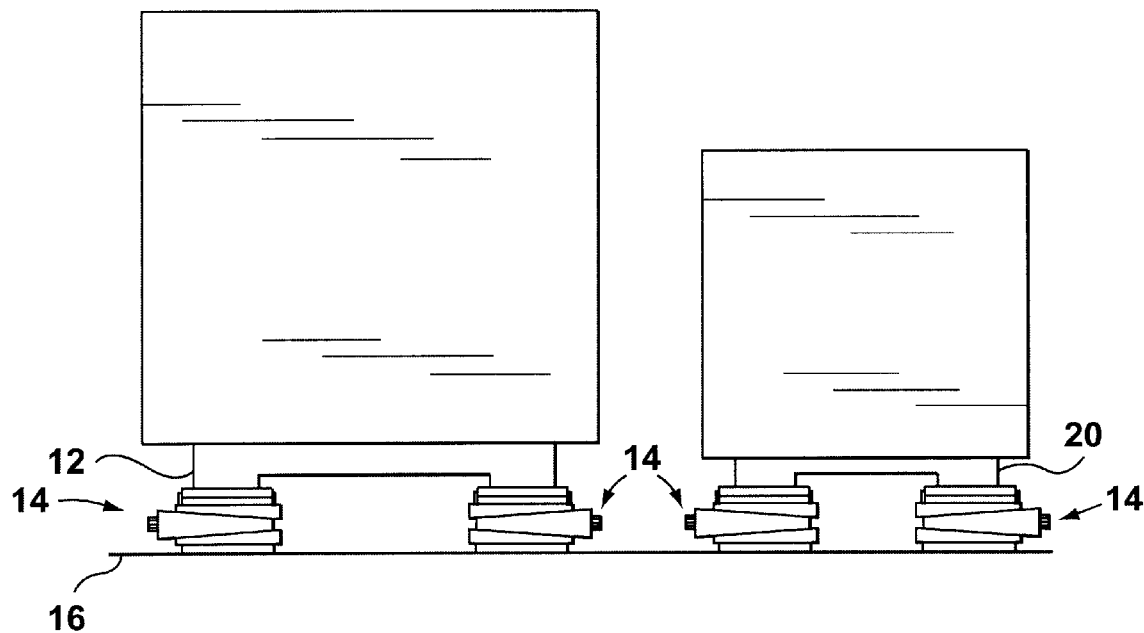
FIG. 1 is a schematic representation of an industrial machine system and a plurality of machine mount assemblies.

An embodiment of the present invention will be described with reference to FIG. 1. A primary machine 10, for example a molding machine, is supported by a primary machine frame member 12. Placed between a bottom surface of the frame member 12 and the concrete foundation 16 are a plurality of machine mount assemblies generally indicated as 14.

A secondary machine 18, for example a robot, is supported by a secondary machine frame member 20. Placed between a bottom surface of the frame member 20 and the floor 16 are a plurality of machine mount assemblies generally indicated as 14.

Figure 2:
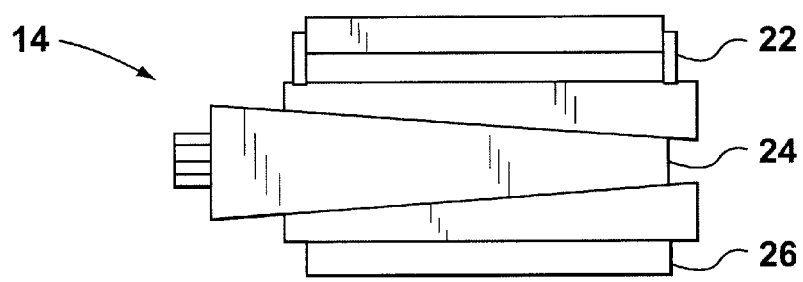
FIG. 2 is a front view of a machine mount assembly showing a machine mount, an adjustable member, and a floor pad member.

Referring now to FIG. 2, the machine mount assembly of the present invention is further described. The machine mount assembly 14 includes a machine mount 22, a height adjustable member 24, and a pad member 26. The machine mount 22 prevents machine walking and creeping by dissipating machine horizontal shock forces.

The adjustable member 24 provides different heights for leveling the machine on an uneven concrete foundation 16. The adjustable member 24 is shown as a separate wedge device, but may be alternatively integral to the machine mount 22, or may be a threaded rod device extending between an upper surface of the machine mount 22 and the frame member 12.

The pad member 26 absorbs machine vibrations and is typically formed of neoprene. The pad member 26 is shown as a separate member and is placed between the concrete foundation 16 and the adjustable member 24. The pad member 26 may also be placed between the concrete foundation 16 and the machine mount 22. Alternatively, the pad member 26 may be replaced by a coating located on a bottom surface of either the machine mount 22 or the adjustable member 24.

Figure 3:
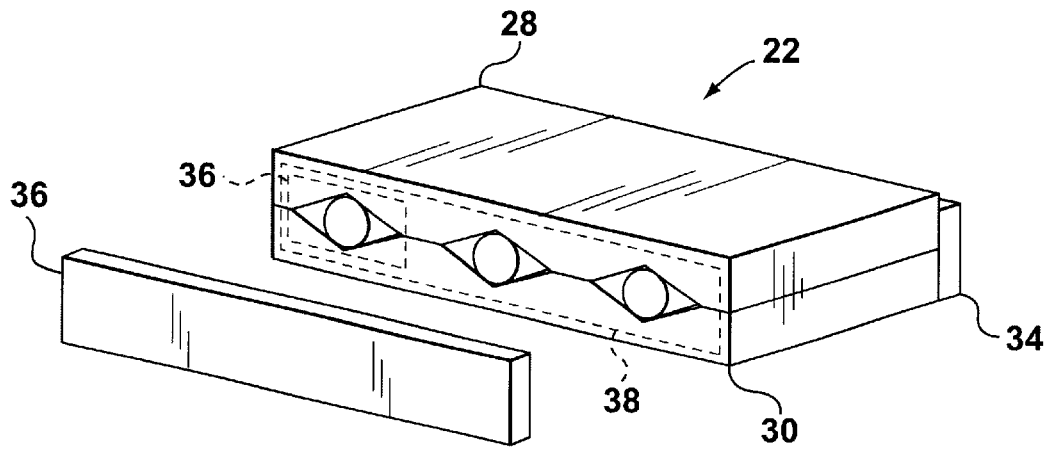
FIG. 3 is a perspective view of a machine mount assembly.
Figure 4:
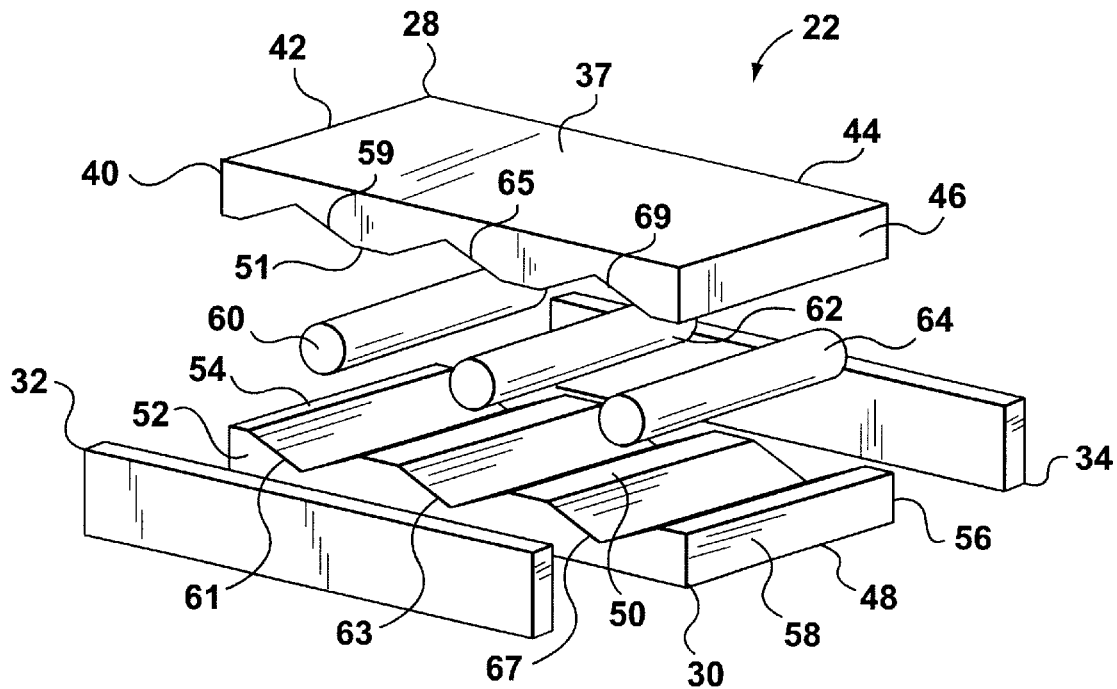
FIG. 4 is an exploded perspective view of a machine mount assembly.

Referring now to FIG. 3 and FIG. 4, the machine mount 22 of the present invention is further described. The machine mount 22 includes a first load bearing member 28 and a second load bearing member 30. The first load bearing member 28 is moveable with respect to the second load bearing member 30 between a resting position and an elevated position. The machine mount 22 includes a force dissipater 38 intermediate the first load bearing member 28 and the second load bearing member 30. The force dissipater 38 includes at least one force dissipating cell 36.

The force dissipating cell 36 permits relative elevational movement of the first load bearing member 28 with respect to the second load bearing member 30.

The first load bearing member 28 is substantially rectangular having a top surface 37, four side surfaces 42, 44, 46, and 40 and a lower bearing surface 51.

The second load bearing member 30 is substantially rectangular having a bottom surface 48, four side surfaces 54, 56, 58, and 52 and an upper bearing surface 50.

The force dissipater 38 is disposed intermediate the first load bearing member 28 and the second load bearing member 30. The force dissipater 38 is shown with a plurality of force dissipating cells 36.

A first force dissipating cell includes a first inwardly extending contour surface formed in the lower bearing surface 51 of the first load bearing member 28, a first roller 60, and a first complimentary inwardly extending contour surface 61 formed in the upper bearing surface 50 of the second load bearing member 30. The first roller 60 is placed in-between the first inwardly extending contour surface 59 and the first complimentary inwardly extending contour surface 61. The contour surfaces (59,61) extend the width of the first and second load bearing members.

The second force dissipating cell includes a second inwardly extending contour surface 65 formed in the lower bearing surface 51 of the first load bearing member 29, a second roller 62, and a second complimentary inwardly extending contour surface 63 formed in the upper bearing surface 50 of the second load bearing member 30. The second roller 62 is placed in-between the second inwardly extending contour surface 65 and the second complimentary inwardly extending contour surface 63.

The third force dissipating cell includes a third inwardly extending surface 69 formed in the lower bearing surface 51 of the first load bearing member 28, a third roller 64, and a third complimentary inwardly extending contour surface 67 formed in the upper bearing surface 50 of the second load bearing member 30. The third roller 64 is placed in-between the third inwardly extending contour surface 69 and the third complimentary inwardly extending contour surface 67. The rollers 60, 62, and 64 are retained in the mount by a first retainer 34 and a second retainer 32.

The contour surfaces extend the width of the first and second load bearing members. Alternatively, the contour surfaces do not extend the width of the first and second load bearing members and may be placed in a pattern about the load bearing members.

Figure 5A:
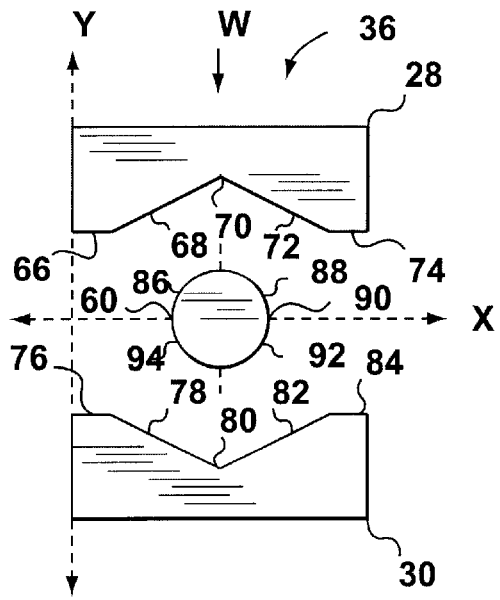
FIGS. 5a, 5b, 5c, and 5d is a front view of a force dissipating cell having complimentary linear inclined surfaces and a roller.

Referring now to FIG. 5a the force dissipating cell 36 of the present invention is now described. A force dissipating cell 36 is formed intermediate the first load bearing member 28 and a second load bearing member 30.

A first inwardly extending contour surface 59 (see FIG. 4) is formed in a lower load bearing surface of the first load bearing member 28. The inwardly extending surface defines a first upper bearing surface 66 and a second upper bearing surface 74.

A complimentary inwardly extending contour surface 61 (see FIG. 4) is formed in an upper load bearing surface of the second load bearing member 30. The inwardly extending contour surface defines a first lower bearing surface 76 and a second lower bearing surface 84.

The inwardly extending contour surface is shown as a substantially V groove having a first inclined surface 68 and a second inclined surface 72. The first inclined surface 68 and second inclined surface 72 meet at an apex 70.

The complimentary inwardly extending contour surface is shown as a substantially V groove having a first complimentary inclined surface 78 and a second complimentary inclined surface 82. The first complimentary inclined surface 78 and the second complimentary inclined surface 82 meet at a second apex 80.

A roller 60 having an outer surface 90 is disposed between the inwardly extending contour surface 59 of the first load bearing member 28 and the complimentary inwardly extending contour surface 61 of the second load bearing member 30. The outer surface 90 of the roller 60 includes a first section 86, a second section 88, a third section 92, and a forth section 94.

Those skilled in the art understand that the diameter of the roller can be selected to ensure the roller rotates and does not slide. Larger diameters of roller will roll compared to smaller diameters of roller.

Figure 5B:
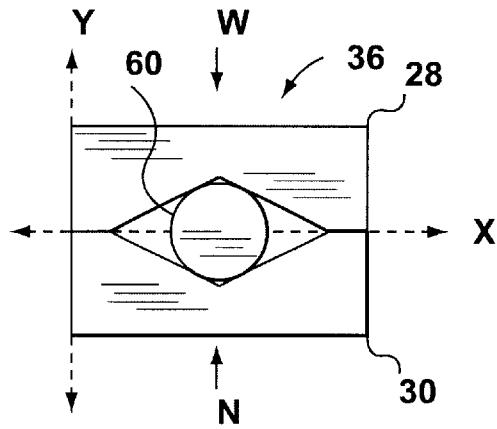

The force dissipating cell 36 is shown in the rest position in FIG. 5b. The rest position supports the weight of a machine along the vertical Y axis without any horizontal forces along the X axis. The first bearing surface 66 contacts the first bearing surface 76 and the second bearing surface 74 contacts the second bearing surface 84 in the resting position for supporting a load along the Y axis. Alternatively, a gap may be provided between the first bearing surface 76 and the second bearing surface 74. The first section 86 of the roller 60 contacts the first inclined surface 68, the second section 88 of the roller 60 contacts the second inclined surface 74, the third section 92 of the roller 60 contacts the second complimentary inclined surface 82, and the fourth section 94 of the roller 60 contacts the first complimentary inclined surface 78. The roller 60 is centered between the apex 70 and the second apex 80 in the rest position.

Figure 5C:
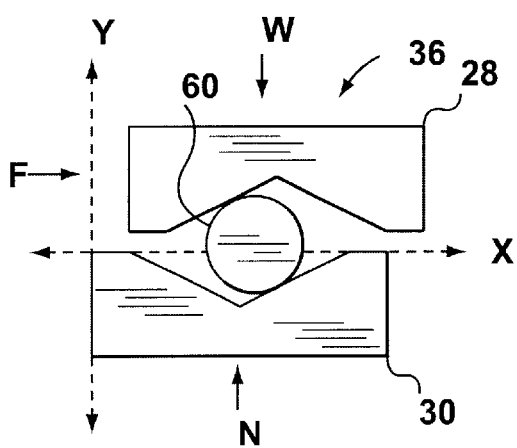

The force dissipating cell 36 is shown in an elevated position in FIG. 5c as a result from a positive horizontal force F directed substantially along the X axis. The horizontal force F is applied to the first load bearing member 28. As the first load bearing member moves to the right, the first inclined surface 68, first section 86 of the roller, third section 92 of the roller, and second complimentary inclined surface 82 cause the first load bearing member 28 to lift away from the second load bearing member 30. The first load bearing member 28 moves to the right and lifts to a maximum elevated position above the second load bearing member 30 where the weight W of the machine counteracts the horizontal force F.

The horizontal force F acts upon the first load bearing member 28, the roller 60, and the second load bearing member 30. At the interface between the roller 60 and the first load bearing member 28, the force F can be considered to be divided into two vector forces, one acting tangentially to the circumference of the roller 60 causing it to roll up the slope. The second vector force is perpendicular to the first included surface 68 acting through the center of the roller 60. At the interface between the roller 60 and the second complimentary inclined surface 82 of the second load bearing member 30, the force acting through the center of the roller 60 is divided into two vector forces, one acting horizontally and the other acting vertically downwards. This horizontal force is smaller than the original horizontal force F and is counteracted by the frictional force between the mount and the floor.

As the roller 60 rotates upwardly along the second complimentary inclined surface 82 it raised the first load bearing member 28 vertically and this motion is counteracted by the weight of the machine.

Then the first load bearing member 28 returns to the rest position as shown in FIG. 5b.

Figure 5D:
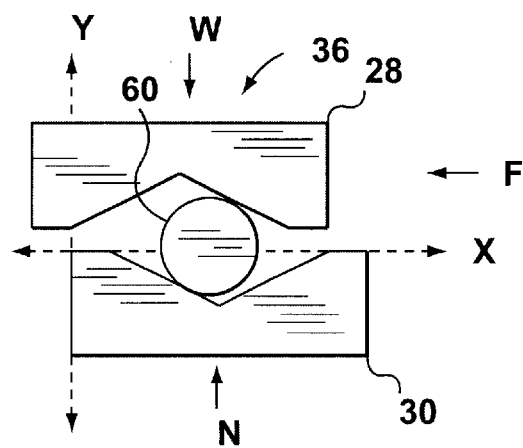

The force dissipating cell 36 is shown in an elevated position in FIG. 5d as a result from a negative horizontal force F directed substantially along the X axis. The horizontal force F is applied to the first load bearing member 28. As the first load bearing member 28 moves to the left, the second inclined surface 72, second section 88 of the roller, fourth section 92 of the roller, and first complimentary inclined surface 78 cause the first load bearing member 29 to lift away from the second load bearing member 30. The first load bearing member 28 moves to the left and lifts to a maximum elevated position where the weight W of the machine counteracts the horizontal force F. Then the first load bearing member 28 returns to the rest position as shown in FIG. 5b.

The first load bearing member 28 and the second load bearing member 30 are self centering in the rest position. The apex 70, apex 80, and the roller 60 provide the self centering alignment.

The slopes of the first inclined surface 68, second inclined surface 72, first complimentary inclined surface 78, and second complimentary inclined surface 82 are equal to provide the same linear rate of lifting the first load bearing member. Different slopes may be applied to change the rate of lifting dependent upon the magnitude of the horizontal forces and the weight of the industrial machine and the coefficient of friction with the floor.

The slopes of the first inclined surface 68 and first complementary inclined surface 78 may be different from the slopes of the second inclined surface 72 and the second complimentary inclined surface 82. This provides one rate of lifting in one direction along the X axis that is a different rate of lifting in the other direction along the X axis to accommodate a larger force in one direction. A force dissipating cell with differing slopes provides differential force dissipation.

The first inwardly extending contour surface 59, complementary inwardly extending contour surface 61, and roller 60 form a force dissipater intermediate the first load bearing member 28 and the second load bearing member 30.

The roller 60 may be a cylinder that extends the width of the bearing members 28, and 30. Alternatively, the roller may be a shorter cylinder, or multiple cylinders. The roller 60 may also be a series of metal balls.

Alternatively, the bearing surfaces 66, 74, 76 and 84 may be omitted and the load is carried through the outer surface 90 of the roller 60 and the surfaces 68, 72, 82, and 78.

Figure 6A:
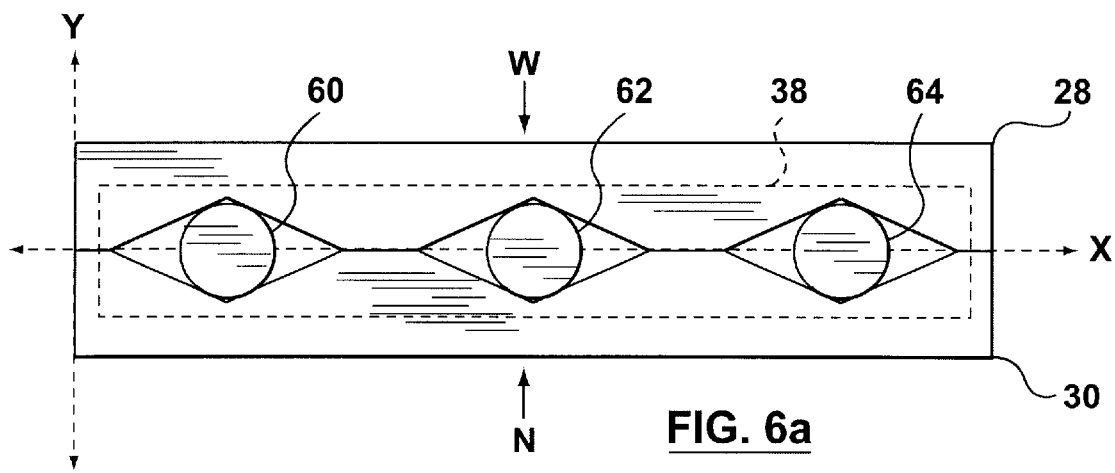
FIGS. 6a, 6b, 6c is a front view of a force dissipater including a plurality of force dissipating cells.

Referring now to FIG. 6a, the force dissipater 38 of the present invention is shown with a plurality of force dissipating cells (three). A first dissipating cell includes a roller 60 disposed between a first inwardly extending contour surface 59 of the first load bearing member 28 and a first complimentary inwardly extending contour surface 61 of the second load bearing member 30. The second dissipating cell includes a second roller 62 disposed between a second inwardly extending contour surface 65 of the first load bearing member 29 and a second complimentary inwardly extending contour surface 63 of the second load bearing member 30. The third dissipating cell includes a third roller 64 disposed between a third inwardly extending contour surface 69 of the first load bearing member 29 and a third complimentary inwardly extending contour surface 67 of the second load bearing member 39.

Figure 6B:
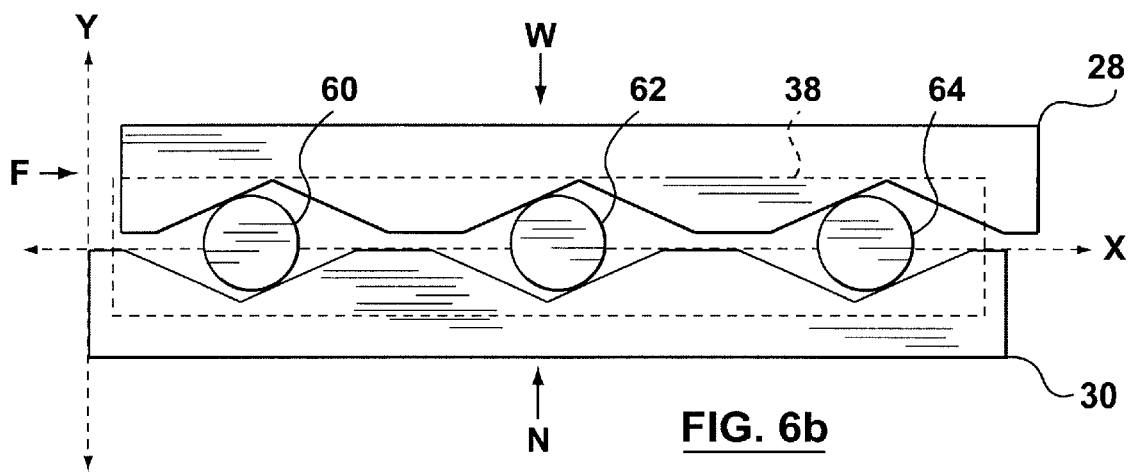
Figure 6C:
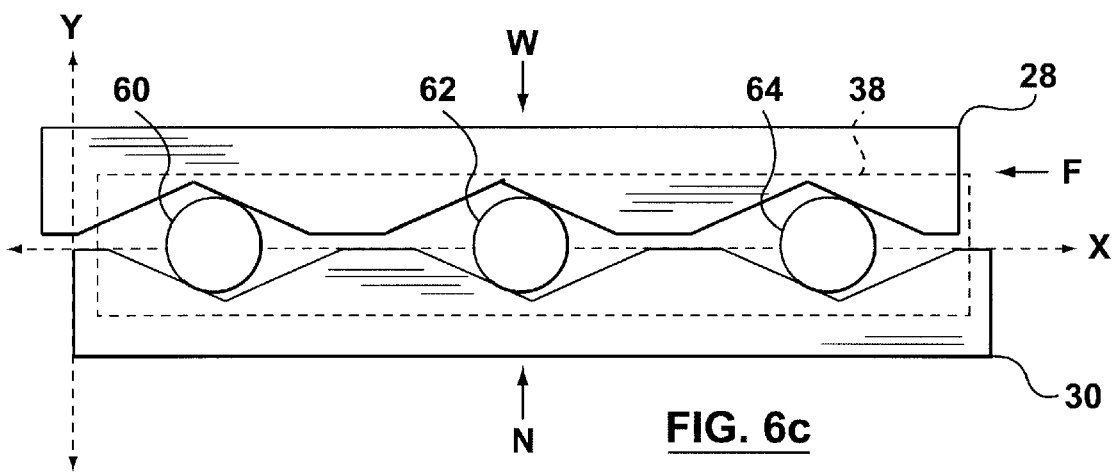

A positive horizontal force F or a negative horizontal force F directed substantially along the X axis moves the first load bearing member 28 in the direction of the applied force causing the first load bearing member 28 to raise to the maximum elevated position (FIG. 6b and FIG. 6c) until the weight W counteracts the force F and stops the movement. Then the first load bearing member 28 lowers to the rest position (FIG. 6a).

The force dissipater 38 maintains the first load bearing member 28 in a level plain during the raising and lowering movement of the first load bearing member 28.

Figure 7A:
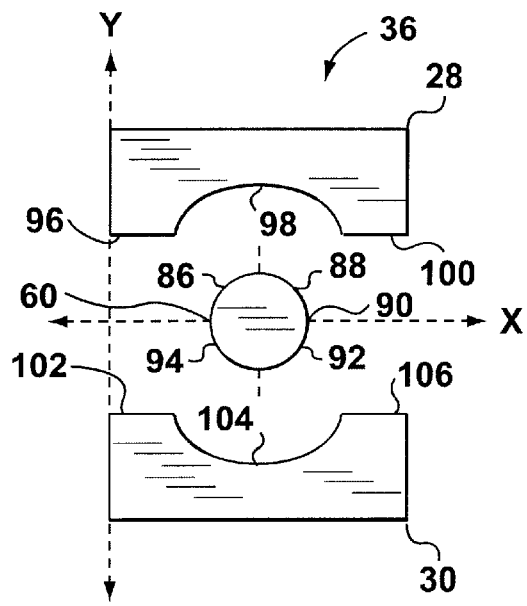
FIGS. 7a, 7b, 7c, and 7d is a front view of a force dissipating cell having complimentary concave inclined surfaces and a roller.

Referring now to FIG. 7a, an alternate force dissipating cell 36 of the present invention is now described.

A concave inwardly extending contour surface 98 is formed in a lower load bearing surface of the first load bearing member 28. The concave surface 98 defines a first bearing surface 96 and a second bearing surface 100.

A complimentary concave inwardly extending contour surface 104 is formed in an upper surface of the second load bearing member 30. The complimentary concave surface 104 defines a first bearing surface 102 and a second bearing surface 106.

A roller 60 having an outer surface 90 is disposed between the concave surface 98 of the first load bearing member 28 and the complimentary concave surface 104 of the second load bearing member 30. The outer surface 90 of the roller 60 includes a first section 86, a second section 88, a third section 92, and a forth section 94.

Figure 7B:
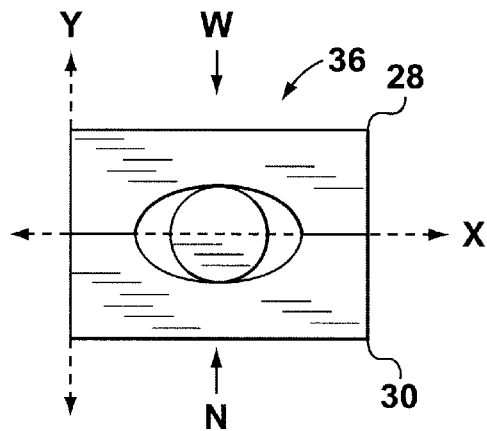

The force dissipating cell 36 is shown in the rest position in FIG. 7b. The rest position supports the weight of a machine along the vertical Y axis without any horizontal forces along the X axis. The first bearing surface 96 contacts the first bearing surface 102 and the second bearing surface 100 contacts the second bearing surface 106 in the resting position for supporting the load about the Y axis. The first section 86 and second section 88 of the roller 60 contact the concave surface 98 of the first load bearing member 28. The third section 92 and the fourth section 94 of the roller 60 contact the complimentary concave surface 104 of the second load bearing member 30.

Figure 7C:
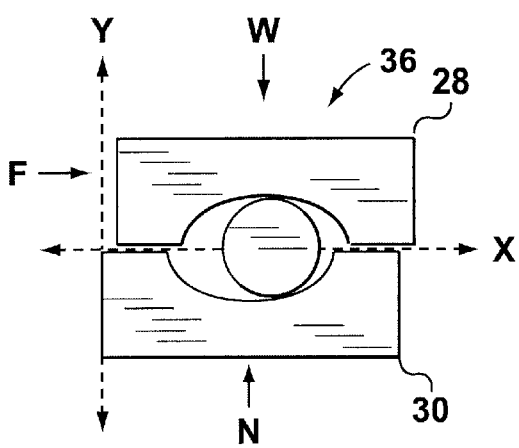

The force dissipating cell 36 is shown in an elevated position in FIG. 7c as a result from a positive horizontal force F directed substantially along the X axis. The horizontal force F is applied to the first load bearing member 28. As the first load bearing member moves to the right, the concave surface 98, roller 60, and complimentary concave surface 104 cause the first load bearing member 28 to lift away from the second load bearing member 30. The first load bearing member 28 moves to the right and lifts to a maximum elevated position where the weight W of the machine counteracts the horizontal force F. Then the first load bearing member 28 returns to the rest position as shown in FIG. 7b.

Figure 7D:
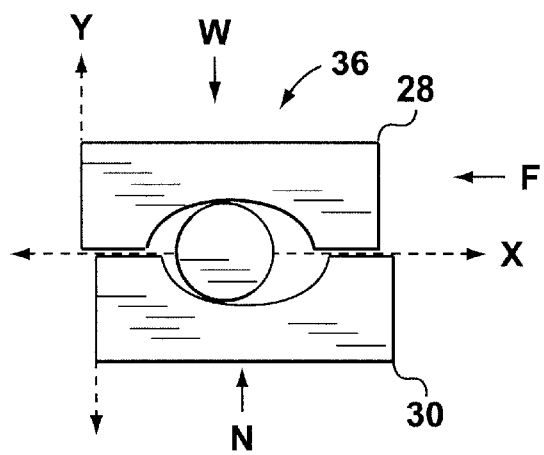

The force dissipating cell 36 is shown in an elevated position in FIG. 7d as a result from a negative horizontal force F directed substantially along the X axis. The horizontal force F is applied to the first load bearing member 2. As the first load bearing member moves to the left, the concave surface 98, roller 60, and complimentary concave surface 104 cause the first load bearing member 28 to lift away from the second load bearing member 30. The first load bearing member 29 moves to the left and lifts to a maximum elevated position where the weight W of the machine counteracts the horizontal force F. Then the first load bearing member 29 returns to the rest position as shown in FIG. 7b.

The shape of the concave inclined surfaces 98 and 104 define a non-linear force dissipater. The amount of travel in the X axis direction is not linear to the amount of lift to the first load bearing member 28. This allows for vibrational movement of the first load bearing member 28 with respect to the second load bearing member 30. The steepness or shallowness of the concave surface also defines how quickly or slowly the first load bearing member 28 will lift to dissipate the force F - For example, if the concave inclined surface is steep, the first load bearing member 28 will lift a greater amount than the distance traveled along the X axis. Alternatively, if the concave surface is shallow, the first load bearing member 28 will lift a lesser amount than the distance traveled along the X axis. The concave surfaces 98 and 104 may be elliptical or parabolic, or some other contour designed to optimize the counter action of the force F for a given machine weight W and the given coefficient of friction with the floor.

The first inwardly extending concave surface 98, complementary inwardly extending concave surface 104, and roller 60 form a force dissipater intermediate the first load bearing member 28 and the second load bearing member 30.

Figure 8A:
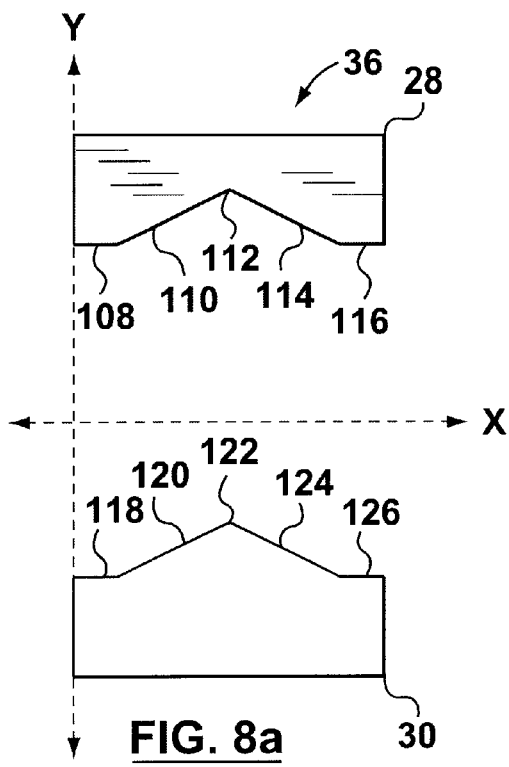
FIGS. 8a, 8b, 8c, and 8d is a front view of a force dissipating cell having complimentary linear inclined surfaces.

Referring now to FIG. 8a, an alternate force dissipating cell 36 of the present invention is now described.

An inwardly extending contour surface 59 is formed in a lower load bearing surface of the first load bearing member 28. The inwardly extending contour surface defines a first bearing surface 108 and a second bearing surface 116.

A complimentary outwardly extending contour surface is formed in an upper load bearing surface of the second load bearing member 30. The outwardly extending surface defines a first bearing surface 118 and a second bearing surface 126.

The inwardly extending contour surface is shown as a substantially V groove having a first inclined surface 110 and a second inclined surface 114 which meet at a first apex 112.

The complimentary outwardly extending contour surface is shown as a substantially triangular shape having a first complimentary inclined surface 120 and a second complimentary inclined surface 124 which meet at a second apex 122.

Figure 8B:
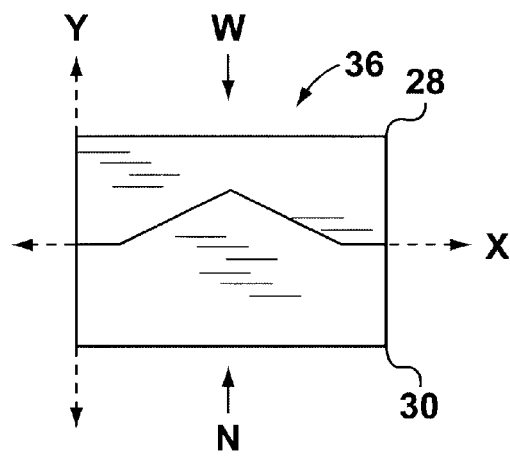

The force dissipating cell 36 is shown in the rest position in FIG. 8b. The rest position supports the weight of a machine along the vertical Y axis through the bearing surfaces. The first bearing surface 108 contacts the first bearing surface 118, the second bearing surface 116 contacts the second bearing surface 126, the first inclined surface 110 contacts the first complimentary inclined surface 120, and the second inclined surface 114 contacts the second complimentary inclined surface 124.

Figure 8C:
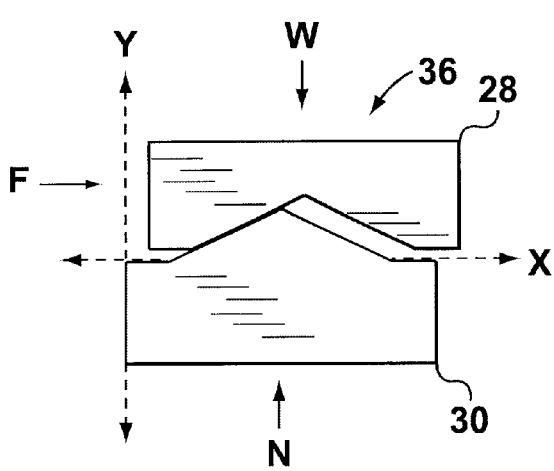

The force dissipating cell 36 is shown in an elevated position in FIG. 8c as a result from a positive horizontal force F directed substantially along the X axis. The horizontal force F is applied to the first load bearing member 28. As the first load bearing member moves to the right, the first inclined surface 110 of the first load bearing member 28 cooperates with the first complimentary inclined surface 120 of the second load bearing member to lift the first load bearing member 28 away from the second load bearing member 30. The first load bearing member 28 moves to the right and lifts to the maximum elevated position where the weight W of the machine counteracts the horizontal force F. Then the first load bearing member 28 returns to the rest position as shown in FIG. 8b.

Figure 8D:
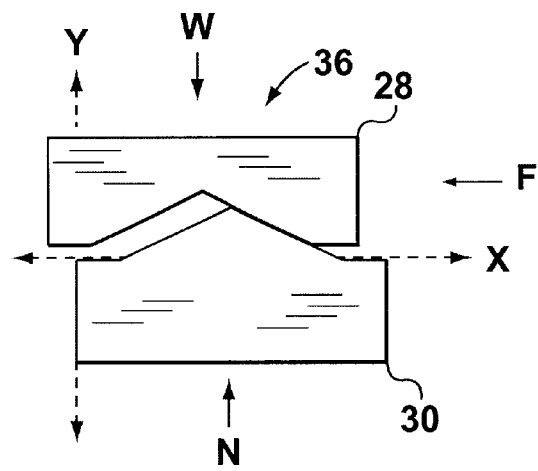

The force dissipating cell 36 is shown in an elevated position in FIG. 8d as a result from a negative horizontal force F directed substantially along the X axis. The horizontal force F is applied to the first load bearing member 28. As the first load bearing member moves to the left, the second inclined surface 114 of the first load bearing member 29 cooperates with the second complimentary inclined surface 124 of the second load bearing member to lift the first load bearing member 29 away from the second load bearing member 30. The first load bearing member 28 moves to the left and lifts to the maximum elevated position where the weight W of the machine counteracts the horizontal force F. Then the first load bearing member 28 returns to the rest position as shown in FIG. 8d.

The first inwardly extending contour surface 59 (see FIG. 4), and complementary outwardly extending contour surface form a force dissipater intermediate the first load bearing member 28 and the second load bearing member 30.

Figure 9:
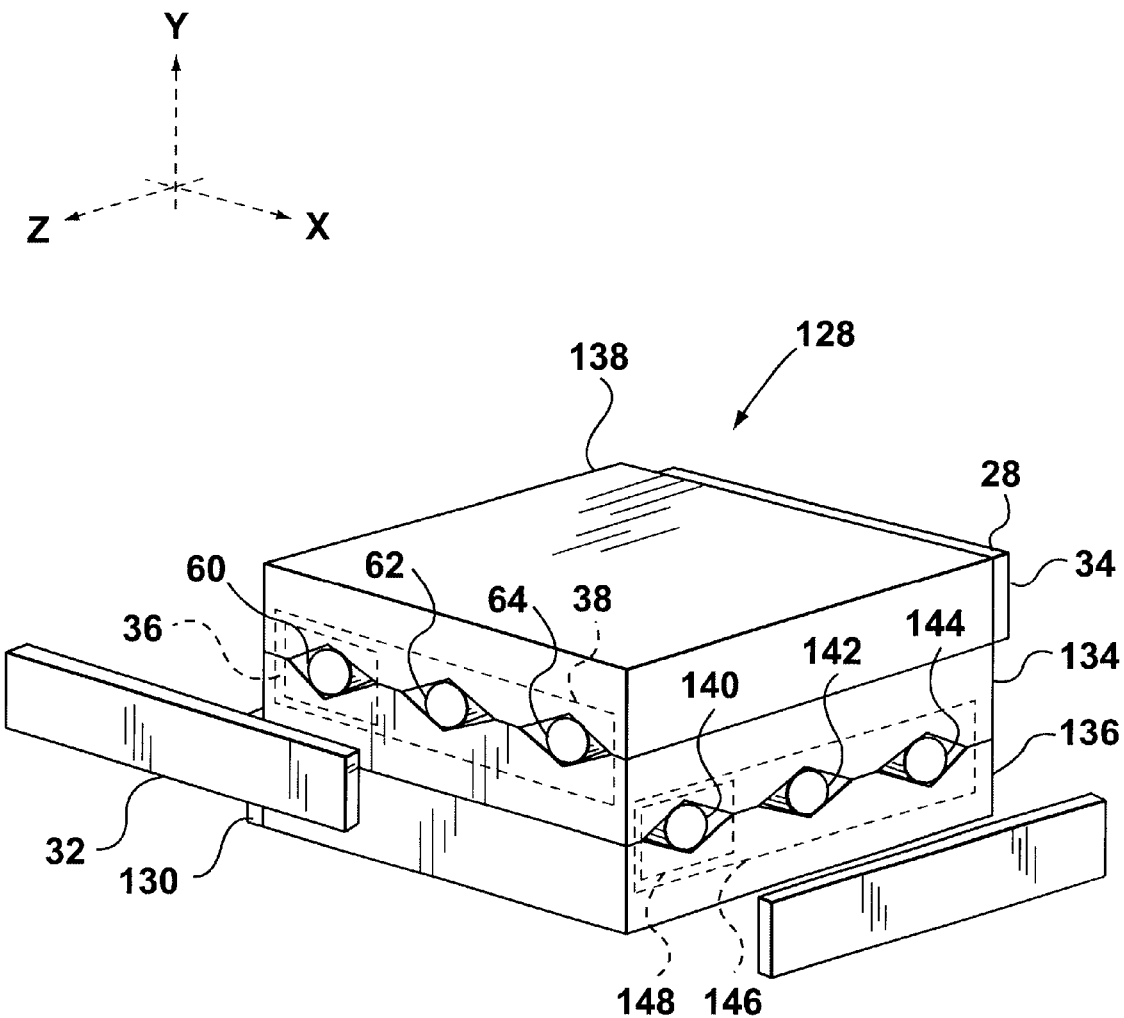
FIG. 9 is a perspective view of a stacked pair of machine mounts.

Referring now to FIG. 9, an alternate machine mount 128 of the present invention is now described. The machine mount 128 includes a first load bearing member 138, an intermediate load bearing member 134, and a second load bearing member 136.

A force dissipater 38 is disposed intermediate the first load bearing member 138 and the intermediate load bearing member 134. The force dissipater includes a plurality of force dissipating cells 36 illustrated by the first roller 60, second roller 62 and third roller 64.

A second force dissipater 146 is disposed intermediate the intermediate load bearing member 134 and the second load bearing member. The force dissipater 146 includes a plurality of force dissipating cell illustrated by the forth roller 140, fifth roller 142 and sixth roller 144.

The combined force dissipater of this embodiment dissipates a force directed in a 360 degree plane substantially perpendicular to the Y axis. The force dissipater 38 reacts to horizontal forces directed substantially along the X axis. The second force dissipater 146 reacts to horizontal forces directed substantially along the Z axis. The force dissipater 38 and the second force dissipater 146 reacts together to horizontal forces directed about a plane substantially perpendicular to the Y axis.

Alternatively, one force dissipating cell may be used in each force dissipater (36, 148). The force dissipating cell may be selected from the configuration as shown in FIG. 5, 7 or 8. The force dissipater 38 may include retainers (32, 34) to retain the rollers (60, 62, 64) in the cell. The second force dissipater 146 may also include retainers (130, 132) to retain the rollers (140, 142, 144).

In operation, a plurality of machine mounts (22, or 128) are placed between a machine and concrete foundation. The machine mounts are adjusted to level the machine. The first load bearing member is secured to the machine by conventional means. Alternatively, the first load bearing member is secured to the machine through a conventional leveling adjuster. The first load bearing member is secured to ensure movement with the machine during horizontal dynamic force. A horizontal dynamic force causes the dissipater to lift the machine for a short limited moment to counteract the horizontal force with a vertical force (weight).

The contour surface and complimentary contour surface of the force dissipating cell is selected to ensure no movement during normal operation as long as the horizontal force does not exceed a certain predefined limit. Once this limit is exceeded, the first load bearing member moves with respect to the second load bearing member lifting to a maximum height dissipating the horizontal force. Those skilled in the art appreciate the slope and shape of the contour surfaces are selected to provide the maximum height and movement of the first load bearing member with respect the second load bearing member.

The components of the machine mount (22, 128) are made of steel. The inclined surfaces of the force dissipating cells 36 may be machined into the bearing surfaces of the first load bearing member, the intermediate load bearing member, and the second load bearing member. These inclined surfaces should be smooth to permit sliding movement. The retainers may be fastened to the sides of the load bearing members. Alternatively the retainers may be formed in the load bearing members.

The contoured surfaces may have grease applied to ensure movement and avoid galling.

It is to be understood by those skilled in the art that the present invention is not limited to the illustrations described and shown herein, which are deemed to be illustrative of an embodiment of the invention and may be modified without departing from the scope and spirit of the invention. The invention is intended to encompass all modifications, which are within its scope and spirit as defined by the attached claims.

What is claimed is:

1. A machine mount provided between a machine and a supporting structure to substantially reduce the displacement of said machine along said supporting structure due to vibration produced by said machine, comprising:
    a first load bearing member for supporting said machine,
    a second load bearing member for supporting said machine, and
    a force dissipater disposed intermediate said first load bearing member and said second load bearing member, said force dissipater communicating with said first load bearing member and said second load bearing member permitting movement of said first load bearing member with respect to said second load bearing member between a rest position and an elevated position, said first load bearing member contacting said second load bearing member in the rest position, said force dissipater including at least one force dissipating cell, said at least one force dissipating cell comprising a pair of V-shaped complimentary surfaces, said pair of complimentary surfaces including an outwardly extending surface and an inwardly extending surface permitting elevated movement of said first load bearing member with respect to said second load bearing members, said inwardly extending surface comprising a groove formed on a bearing surface of said first load bearing member, said outwardly extending surface is formed on a bearing surface of said second load bearing member.

2. The machine mount of claim 1 further comprising another inwardly extending surface which comprises another groove formed on a bearing surface of said second load bearing member, and further comprising another outwardly extending surface formed on a bearing surface of said first load bearing member.

3. The machine mount of claim 2 wherein said another groove is triangular and said another outwardly extending surface is triangular and an apex of said another groove aligns with an apex of said another outwardly extending surface in said rest position.

4. The machine mount of claim 1 wherein said force dissipating cell further comprises:
    a roller, said roller disposed between said inwardly extending grooves for rolling contact with surfaces of said grooves permitting elevated movement of said first load bearing member with respect to said second load bearing member.

5. The machine mount of claim 4 wherein said inwardly extending groove is triangular and said another inwardly extending groove is triangular and an apex of said inwardly extending groove aligns with an apex of said another inwardly extending groove in the rest position.

6. The machine mount of claim 4 wherein said inwardly extending groove is parabolic and said another inwardly extending groove is parabolic.

7. The machine mount of claim 4 wherein said roller comprise s a cylindrical rod extending lengthwise in said grooves.

8. The machine mount of claim 7 further comprising a retainer for retaining said cylindrical rod in said grooves.

9. A machine mount provided between a machine and a supporting structure to substantially reduce the displacement of said machine along said supporting structure due to vibration produced by said machine, comprising:
    a first load bearing member for supporting said machine,
    an intermediate load bearing member for supporting said machine,
    a second load bearing member for supporting said machine,
    a first force dissipater disposed intermediate said first load bearing member and said intermediate load bearing member, said first force dissipater communicating with said first load bearing member and said intermediate load bearing member permitting movement between a rest position and an elevated position, said first load bearing member transmitting weight directly to said intermediate load bearing member in the rest position, said first force dissipater including at least one force dissipating cell and comprising a pair of V-shaped complimentary surfaces, said pair of complimentary surfaces including a first outwardly extending surface and a first inwardly extending surface permitting elevated movement of said first load bearing member with respect to said intermediate load bearing members, said first inwardly extending surface comprising a groove formed on a bearing surface of said first load bearing member, said first outwardly extending surface being formed on a bearing surface of said intermediate load bearing member, and a second force dissipater disposed intermediate said intermediate load bearing member and said second load bearing member, said second force dissipater communicating with said intermediate load bearing member and said second load bearing member permitting movement between a rest position and an elevated position.

10. The machine mount of claim 9 wherein said second force dissipater includes at least one force dissipating cell.

11. The machine mount of claim 10 wherein said force dissipating cell of said second force dissipater comprises a pair of complimentary surfaces, said pair of complimentary surfaces including a second outwardly extending surface and a second inwardly extending surface.

12. The machine mount of claim 10 wherein said force dissipating cell of said second force dissipater further comprises:

a first inwardly extending groove formed in a bearing surface, a second inwardly extending groove formed in another bearing surface, and a roller, said roller disposed between said first and said second inwardly extending grooves for rolling contact with surfaces of said grooves.

13. The machine mount of claim 9 further comprising:

an adjustable member permitting vertical height adjustment of said machine for leveling said machine on a concrete foundation.

* * * * *